US008751958B2

(12) United States Patent
Mudge et al.

(10) Patent No.: US 8,751,958 B2
(45) Date of Patent: Jun. 10, 2014

(54) SYSTEM AND METHOD OF INTEGRATING WEB-BASED GRAPHICAL USER INTERFACES WITH DATA FROM EXTERIOR SOURCES

(75) Inventors: Robert S. Mudge, Maitland, FL (US); Robert J. Norton, Orlando, FL (US)

(73) Assignee: Lockheed Martin Corporation, Orlando, FL (US)

( * ) Notice: Subject to any disclaimer, the term of this patent is extended or adjusted under 35 U.S.C. 154(b) by 1517 days.

(21) Appl. No.: 11/684,039

(22) Filed: Mar. 9, 2007

(65) Prior Publication Data

US 2007/0277114 A1 Nov. 29, 2007

Related U.S. Application Data (60) Provisional application No. 60/792,639, filed on Apr. 17, 2006.

(51) Int. Cl.
*G06F 3/048* (2013.01)
(52) U.S. Cl.
USPC ........... 715/790; 715/791; 715/792; 715/793; 715/794; 715/795; 715/766
(58) Field of Classification Search
USPC .......................................... 715/766, 790–796
See application file for complete search history.

(56) References Cited

U.S. PATENT DOCUMENTS

| | | | | |
|---|---|---|---|---|
| 4,769,636 A * | 9/1988 | Iwami et al. | ................... | 715/790 |
| 4,806,919 A * | 2/1989 | Nakayama et al. | ............ | 715/790 |
| 5,487,143 A * | 1/1996 | Southgate | ..................... | 715/790 |
| 5,590,265 A * | 12/1996 | Nakazawa | ..................... | 715/790 |
| 6,115,040 A * | 9/2000 | Bladow et al. | ................. | 715/741 |
| 6,615,258 B1 * | 9/2003 | Barry et al. | ..................... | 709/223 |
| 7,484,179 B2 * | 1/2009 | Hennings et al. | ............. | 715/764 |
| 2004/0001093 A1 * | 1/2004 | Sellers et al. | .................. | 345/766 |
| 2004/0088438 A1 * | 5/2004 | Madril et al. | .................. | 709/250 |
| 2004/0260749 A1 * | 12/2004 | Trossen et al. | ................. | 709/200 |
| 2005/0055644 A1 * | 3/2005 | Stockton | ....................... | 715/766 |
| 2006/0236255 A1 * | 10/2006 | Lindsay et al. | ............... | 715/766 |
| 2009/0319930 A1 * | 12/2009 | Groh et al. | ..................... | 715/769 |

OTHER PUBLICATIONS

Microsoft Windows xp Professional, 1985-2001 Microsoft Corporation.*
Stuart K. Card, Jock D. Mackinlay, Ben Shneiderman. Readings in Information Visualization Using Vision to Think, 1999, Morgan Kaufman Publishers, USA.
Terry Winograd, Bringing Design to Software, 1996, ACM Press, USA.
John F. Sowa, Knowledge Representation, 2000, Brooks/Cole, USA.
Joann T. Hackos, Janice C. Redish, User and Task Analysis for Interface Design, 1998, John Wiley & Sons, USA and Canada.
Amy Aragones, Jeanette Bruno, Andrew Crapo, Marc Garbiras, An Ontology-Based Architecture for Adaptive Work-Centered User Interface Technology, 2006. Nisakayuna NY USA.

(Continued)

*Primary Examiner* — Andrey Belousov
*Assistant Examiner* — Meseker Takele
(74) *Attorney, Agent, or Firm* — Withrow & Terranova, PLLC (57) ABSTRACT

Commercially available applications which display information via a graphical user's interface can be supplemented with additional related information. The related information can be automatically extracted and overlaid on the information with the assistance of a pre-established ontology.

21 Claims, 7 Drawing Sheets

PRESENTATION OBJECTS FOR FLIGHT LINE (56) References Cited

OTHER PUBLICATIONS

Kim J. Vicente, HCI in the Global Knowledge-Based Economy: Designing to Support Worker Adaptation, ACM Transactions on Computer-Human Interaction. vol. 7, No. 2, 2000, Canada.

Robert G. Eggleston, Randall D. Whitaker, Work Centered Support System Design: Using FramesTo Reduce Work Complexity, Baltimore, MD 2002.

Todd, Peter and Izak Benbasat, Evaluating the Impact of DSS, Cognative Effort, and Incentives on Strategy Selection, 1999, Information Systems Research 10:4, USA.

* cited by examiner

Figure 1: COTS ERP Forms Interface

PRIOR ART

FIG. 2

WORK CENTERED SUPPORT SYSTEMS PRINCIPLES
*FIG. 3*

| IFS AIRCRAFT PRIORITY | | | | | 52 |
|---|---|---|---|---|---|
| TAIL NO. | MC | Hrs TO | Mx EVENT | JCN | Pri. |
| 80-0601 | NMC | 164.35 | Observed | 16 | 1339 |
| 80-0805 | PMC | 120.68 | Prepared | 16 | 1243 |
| 80-0609 | FMC | 120.68 | | | 174 |
| 80-0603 | FMC | 164.35 | WorkDone | | 134 |
| 80-0601 | FMC | 164.35 | | | 128 |
| 80-0608 | NMC | | | | 112 |
| 80-0607 | NMC | | Prepared | 8 | 112 |
| 80-0610 | NMC | | WorkDone | | 108 |
| 80-0604 | NMC | | | | 101 |
| 80-0606 | FMC | 312.35 | | | 87 |

| IFS CHECKERBOARD | | | | | | | 54 |
|---|---|---|---|---|---|---|---|
| TAIL NO. | Sun | Mon | Tue | Wed | Thr | Fri | Sat |

JSF TECH DATA

F-35 JOINT STRIKE FIGHTER PROGRAM 56
F35 INTEGRATED CANOPY AND FRAME
NSN: 16K0510-641

| AMU STATUS DETAILS | | | | | | | | | | 60 |
|---|---|---|---|---|---|---|---|---|---|---|
| TAIL No. | LOCATION | BIC | LFD | DAYS DOWN | FAST COAT | SCL | IITS | ECM | ENG SER | JOAP CODE |
| 10-0641 | A-10 | 110 | 1 | | B | 7803 | IGP | 420 | E6367 | A |
| 20-0542 | C-5 | 104 | 7 | | B | 8228 | IGP | 451 | E6335 | A |
| 60-4123 | B-15 | 99 | 12 | | B | 7225 | HTS | 358 | E6432 | A |
| 80-5402 | B-11 | 110 | 1 | | B | 7824 | HTS | 405 | E6752 | A |
| 60-5723 | A-12 | 107 | 4 | | C | 7112 | | | E6254 | A |
| 10-7743 | C-2 | 110 | 1 | | C | 7114 | | | E6298 | A |
| 20-0671 | A-15 | 110 | 1 | | C | 7122 | | | E6224 | A |
| 60-9421 | C-1 | 107 | 4 | | C | 7115 | | | E6337 | A |
| 80-8742 | B-10 | 110 | 1 | | B | 8238 | IGP | 438 | E6651 | A |
| 60-3159 | A-14 | 108 | 6 | | C | 7118 | | | E6742 | A |

| | TMr JOAP | ENG PHASE | SA hr. | SEA hr. |
|---|---|---|---|---|
| | 0 | 56.0 | | 33.4 |
| | 0 | 28.8 | 10.8 | 12.8 |
| | 0 | 238.9 | 50.6 | 100.2 |
| | 0 | 291.2 | 23.7 | 33.7 |
| | 0 | 355.6 | 13.4 | 22.8 |
| | 0 | 81.6 | 30.0 | 7.5 |
| | 0 | 226.7 | 18.4 | 30.1 |
| | 0 | 365.3 | 18.5 | 58.6 |
| | 0 | 38.1 | | 88.4 |
| | 0 | 325.7 | 10.4 | 36.9 |

F35 ENGINE 62
NSN: 10-21023-1

IFS PHASE FLOW 58
HOURS: 400 300 200 100 0
TAIL NO.: 80-0801, 80-0802, 80-0803, 80-0804, 80-0805, 80-0806, 80-0807, 80-0808, 80-0809, 80-0810

PRESENTATION OBJECTS FOR FLIGHT LINE 50

*FIG. 6*

FIG. 7 WORK ORDER WITH TECH DATA

SYSTEM AND METHOD OF INTEGRATING WEB-BASED GRAPHICAL USER INTERFACES WITH DATA FROM EXTERIOR SOURCES

CROSS REFERENCE TO RELATED APPLICATION

This application claims the benefit of the filing date of U.S. Provisional Application Ser. No. 60/792,639 filed Apr. 17, 2006 and entitled "System and Method of Integrating Web-Based Graphical User Interfaces with Data from an Exterior System" and which is incorporated herein by reference.

FIELD

The invention pertains to graphical user interfaces which present information on computer driven display devices. More particularly, the invention pertains to enhanced interfaces which automatically supplement the presented information with additional related information.

BACKGROUND

Numerous commercial organizations have deployed or have plans to deploy commercial-off-the-shelf (COTS) software for their enterprise resource planning (ERP) systems. Government agencies also have an interest in incorporating and using such systems in day-to-day operations. These enterprise systems include finance, payroll, inventory, shipping, receiving, personnel, and logistics.

ERP system suppliers range from SAP, IFS, Oracle, and a host of other smaller suppliers which focus on specific logistics capabilities. Many ERP vendors are moving to the Internet with web based graphical user based interfaces that enable an internet web browser to host the capabilities of the ERP system. The use of COTS software offers a low technical risk solution, proven and tested by commercial customers where customers drive new functionality and the market price. COTS software vendors bear the risk and cost of implementing upgrades and fixes while spreading their cost over the entire user base.

Commercial software packages are often marketed as offering an easy-to-use and intuitive user interface, formal training, and documentation refined through years of customer use. In-house support staff requirements for the end user should also be reduced as COTS products are designed to be operational out-of-the-box and ready to use.

Figure 1:
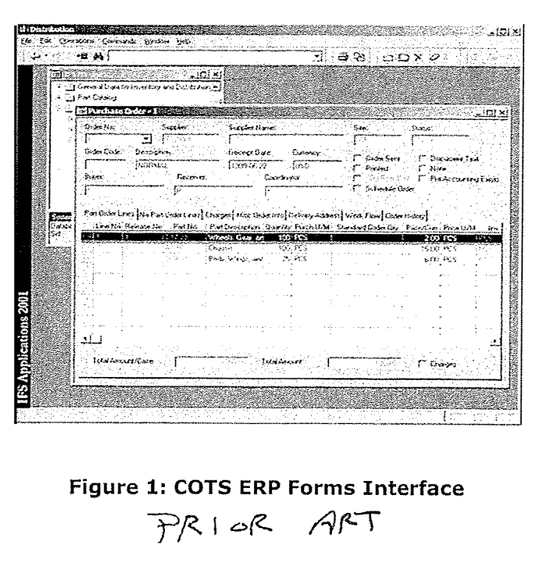
FIG. 1 illustrates a prior art ERP distribution system graphical screen.

While the above described scenario is desirable, the reality of COTS products becomes apparent as users discover the complexity and cost of business process blueprinting, configuration, customization, deployment, and day-to-day operations. A general industry solution often does not align well to the terminology, business processes, and work artifacts of a unique or highly specialized business. COTS user graphical interfaces usually take the form of generalized tables and forms, using data, terminology, and units of measure designed by the ERP application engineers. FIG. 1 illustrates a representative distribution system graphical screen that might be used by a variety of business entities or organizations.

The ERP solution requires the extraction, translation, and load of industry specific information into the ERP proprietary data schema. Business process and functionality gaps between the general and specific work domains require configuration and customization which can jeopardize upward compatibility to the next release of the COTS system.

A simple schema change by the COTS vendor can have a tremendous ripple effect through deployed systems. Often companies which have been successful deploying ERP have adopted the out-of-the-box product with no to minimal customizations. If customization is too costly, users face an economic and resource problem in closing the gap between their perspective on the work domain and the general functions provided by COTS products.

Once a company or organization has invested in, converted, and deployed a COTS ERP system, end users have little choice but to adapt to their new work domain. Ideally the COTS application user interface should present information to the end user in a familiar form. However, this is generally not the case.

Users at times need to spend a good deal of time training to become experts with the ERP application and user interface. The degree of this expertise is directly proportional to the productivity of the user.

In many military positions, users may spend twelve to eighteen months before promotion brings a new role, ERP, and user interface challenges. In the military work domain there simply is not time to become an expert before promotion, deployment, or war.

Human beings will adapt work techniques when faced with complex and difficult to comprehend computer application user interfaces. This adaptation can range from homegrown tools, spreadsheets, reversion to pad and paper, or data entry when time permits. Users must often make mental transforms between the work they know and the synthetic work domain of the ERP user interface. There is thus a need for systems and methods, independent of COTS products, software, or legacy systems which can provide friendly and familiar visualizations for decision support.

Known types of Work-centered Support Systems (WCSS) are built upon the premise that a system that provides the user with the right information at the right time and in the right format will provide a real and substantial benefit. What constitutes the right information, the right format, and the right time will almost always depend on the objective of the user and will often depend upon the user himself. These information needs are often dynamic, particularly in relatively open-ended work domains such as maintenance planning and operations, in which equipment status and resource availability are uncertain.

Since WCSS are tasked with predicting what will be most helpful to the user in a given context, WCSS software in this domain will usually be model-based. Predictive models of work in general and the particular work domain in specific must exist before the relevance of information can be evaluated. Models of user behavior in general, of users playing specific roles in this work domain, and of a user's personal preferences are also necessary to enable tailoring of information content and presentation.

One known form of WCSS is publicly available and downloadable from sourceforge.net under the name of "Adaptive Work-Centered Interface Technology" (ACUITy). See also, "Adaptive Work-Centered User Interface Technology" by Andrew W. Craps publ. May 11, 2006, Jena User Conference, and "An Ontology-Based Architecture for Adaptive Work-Centered User Interface Technology," Aragones et al., May 11, 2006, Jena User Conference both of which are incorporated herein by reference.

ACUITy software architecture embodies two different concepts. The first concept is to use model based architecture to characterize a work domain in terms of "work-centered" activities, as well as, the computation mechanisms that achieve an implementation that supports those activities. The second and equally important concept is to provide adaptive interaction, both user directed and automated, in the work-centered characterization and presentation mechanisms of the user interface to decision support applications.

In the WCSS domain of the ACUITy software, presentation objects, and vantages are of interest. A presentation object captures the "what and how" of displaying a certain set of information to the user. Types of presentation objects include: two dimensional graphs, scrolling tables, text (including html and plain text documents as well as hyperlinks), display groups, external web applications, and user interaction objects such as forms, text entry fields, buttons, and various selection mechanisms (lists, check boxes, radio buttons, etc.).

A vantage is a "window" into work domain information that provides the user with the particular perspective needed to solve a problem or problem set. More formally, a vantage is the collection of presentation objects that are relevant for a particular problem. The type and set of display object sets the base presentation style, the user may, of course, modify its look and feel unless precluded from doing so by ontology restrictions.

Useful as WCSS can be in general and the features of the systems such as the ACUITy software in particular, they do not address the above noted problem of customizing pre-existing, general, enterprise management software systems, or, pre-existing custom software systems directed to a particular problem or environment.

There is a need in decision Support systems to use the work context of the user to personalize the user experience within these COTS software applications with data external to the COTS application framework. Current approaches to this problem would involve developing a custom GUI that would integrate the COTS standard software displays with external data of interest. This type of solution introduces what might be problematic modifications in or additions to the COTS software which detracts from the advantages of using that software. Similar problems are present in trying to incorporate additional information into legacy software systems. There thus continues to be a need for systems and methods which can automatically combine personalized work content of the user with one or more graphical displays generated by another preexisting, or, publicly available software system.

DETAILED DESCRIPTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

The work context for a web-based application is first identified in embodiments of the invention by using a combination of messaging and URL analysis. This context can then be associated with information specified in a knowledge base or ontology to identify additional user-interface components. In accordance with the invention, these components are then automatically extracted and displayed alongside a display generated by the original web-based application.

For example, a flight line maintenance manager may be using a commercially available software package such as the MXI Maintenix or MAXIMO software to review the current open work orders for which he/she is responsible. In an embodiment of the invention, a relation can be created in an ontology expressing a logical relationship, namely, that when the manager looks at the work order screen, he/she would also like to see data about the backordered parts list and a list of available personnel.

In one aspect, a system that embodies the invention retrieves this data from a data source defined in the ontology and generates user interface components to carry the data according to rules in the ontology. These components can then be displayed along with the original graphical screen presented by MXI Maintenix or MAXIMO software to assist the maintenance manager in making decisions.

In yet another aspect of the invention, WCSS principles can be applied in connection with a model-based adaptive user interface, essentially creating dynamic WCSS technology. User and work domain models predict what information will be most valuable to the user in the current context and determine how best to display this information. Additional information can be offered in the periphery of the display but with a cost of access inversely proportional to the inferred probability that access will actually occur. In other words, peripheral information more likely to be needed should be closer to the focus area of the display and therefore easier to perceive and bring into full focus.

Interaction objects in yet another aspect of the invention, enable the user to take an action that will trigger action either in the client user-interface or on a server. In the Web interface, custom client-side effects can be implemented in client-side JavaScript. Server-side effects can be implemented via scripts. A server-side effect might, for example, execute a stored procedure to update an external database, passing into the stored procedure one or more user inputs and possibly other information.

In yet another aspect of the invention, web based COTS software products can be integrated with work-centered decision support data, with particular focus on maintenance planning and logistics. This approach recognizes the fact that companies will not forego their COTS software investment and that end users need to bridge the gap between the work they need to do and the generic information environment that a COTS software product may provide for them.

One exemplary work domain is a jet flight line. Preferably an aircraft maintainer should not be expected to use multiple COTS software applications for maintenance, supply, personnel management, and flight scheduling. The training, operation, and screen coordination for multiple applications creates a daunting experience, resulting in a steep learning curve, increased operational error rates, and work inefficiencies.

The work of opening applications, navigating to the correct screen, locating information, aligning the information for visual correlation with other application screens, increases worker inefficiency. Computer application operation above and beyond the domain intrinsic work is a kind of meta-work. When the user forms a visual orientation of data to solve a problem or form a decision, this aspect is called a vantage for the user to perform work. Embodiments of the invention can reduce this meta-work, and make "real" work more productive, by automatically presenting a vantage of decision support information from internal, external and legacy data sources, in a native visual format correlated with COTS software user interface screens.

In accordance with the invention, the delivery of familiar information outside the visual envelope of a COTS software application is accomplished through a work centered user interface design which uses a "Focus-Periphery" structure. The Focus is a graphical display provided by the COTS software user interface. The Periphery exhibits one or more user familiar work artifacts, not available in the COTS software display or image. A similar structure can be used to improve user interactions with graphical interfaces provided by legacy software.

In an exemplary embodiment, the frame set includes a main or focus frame, a periphery (a right or left) frame and a bottom or control frame. Each frame includes control codes to perform specific operations for the application present within the frame.

The COTS software application exists in the focal frame without knowledge of or integration with decision support information in the peripheral presentation. This presentation is automatically and dynamically composed and rendered in response to user interaction with the COTS software.

Any web based COTS software application can be customized with user helpful decision support information in various formats. A work domain gap analysis can be performed to identify data visualizations that enhance the decision support and/or usability for specific COTS user interface screen. These visualizations can include:

Native work domain visualizations and artifacts not present in the COTS user interface, for example an Aircraft Phase Inspection Flow Graph or a Weekly Aircraft Schedule.

Missing functionality which can improve the user experience or add information to the decision support task, for example a statistical breakdown or work orders by their state.

Agent based information automatically acquired and analyzed for the end users work, for example an aircraft maintenance prioritization agent.

Decision Support information derived from legacy or external systems such as web based technical data correlated with a work order.

In a disclosed embodiment, as the user navigates the COTS application, the frame control code captures the COTS web page URL and data from the Web Browser. Control software is called with this information and an ontology reasoner determines the vantage, based on modeled trigger conditions. Presentation objects defined by the vantage can be extracted and rendered as a supplemental page which is displayed in the periphery frame.

The bottom or control frame provides an area on the screen for information that persists across the COTS screens. For example, some applications operate on a day-of-the-year date format. This format and the current date and time can be continuously displayed. Control frame buttons can be provided that enable the end user to flip back and forth between COTS display and a supplemental display in full screen format, and the above-described split screen. This capability provides a usability feature for Laptops, Tablets, and PDAs where screen size is limited.

Work domain information can be modeled and implemented, using an ontology, as one or more presentation objects. Each presentation object references a data source and a visual format such as table, graph, icon, image, web page, or hyperlink. Complex formats such as layered tables, tables with icons, or highlight regions can be modeled thus creating cross-correlated information.

Presentation objects are grouped into sets to form a vantage. Vantages can contain specific tailoring for each presentation object including position on the screen, size, and style. Vantages are user specific and can be associated with a particular role within the work domain. Each vantage can be assigned to a unique URL driven triggering condition. Data such as a URL sent to the Controller provides a trigger condition. The Controller then displays the associated vantage within the COTS display periphery.

Figure 2:
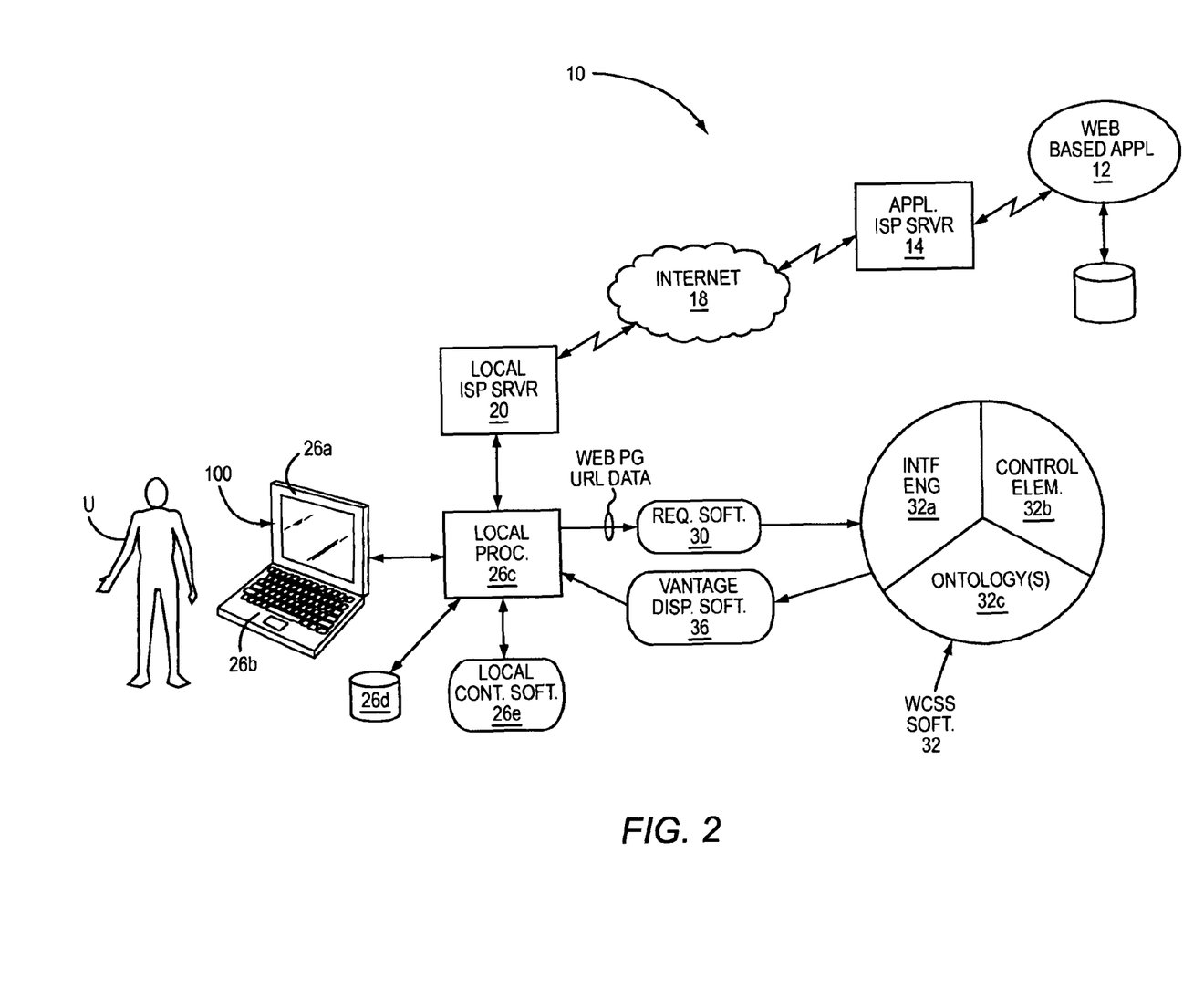
FIG. 2 is a block diagram of a system which embodies the present invention.

FIG. 2 illustrates an overall view of a system 10 in accordance with the invention. As illustrated in FIG. 2, a web based application 12 which can be located at one or more displaced sites communicates via a local ISP server 14, via one or more computer networks such as the Internet 18 to a local ISP server 20 and the user's local computer indicated generally at 24. The user U uses the computer 24 and connectivity via Internet 18 to request services of and to receive pages from web based application 12. The details of such communication and downloading pages from the application 12 are well known to those of skill in the art and need not be described additionally herein.

Computer 24 incorporates a graphical display device 26a, keyboard 26b, programmable processor 26c, disk drive 26d, and local control software 26e which enable the user U to communicate and request services from the web based application 12. The various pages from the web based application 12 can be presented for example as two dimensional graphical images on the display device 26a.

Additionally, as illustrated in FIG. 2, request software 30 which is executed by processor 26c can acquire identification information such as a URL as well as associated data relative to the web page being displayed on the unit 26a and forward same to a work centered support system software package 32 so as to obtain for the user U supplemental information of a customized nature to be presented in conjunction with the page currently being presented on the display unit 26a.

Software 32 can include an Interface Engine 32a, a control element 32b and one or more ontologies 32c. Vantage display software 36 can present the supplemental information on the display 26a.

Those of skill in the art will understand that one of the advantages of systems like the system 10 is that displayed pages from any pre-existing software package can be supplemented with additional customer specified and transaction or institution or process specific information as desired without making any changes to the underlying, pre-existing software package. Hence, graphical displays of pre-existing enterprise resource planning or management software as well as pre-existing process or activity specific software can be enhanced and made more suitable for use by the user U.

Figure 3:
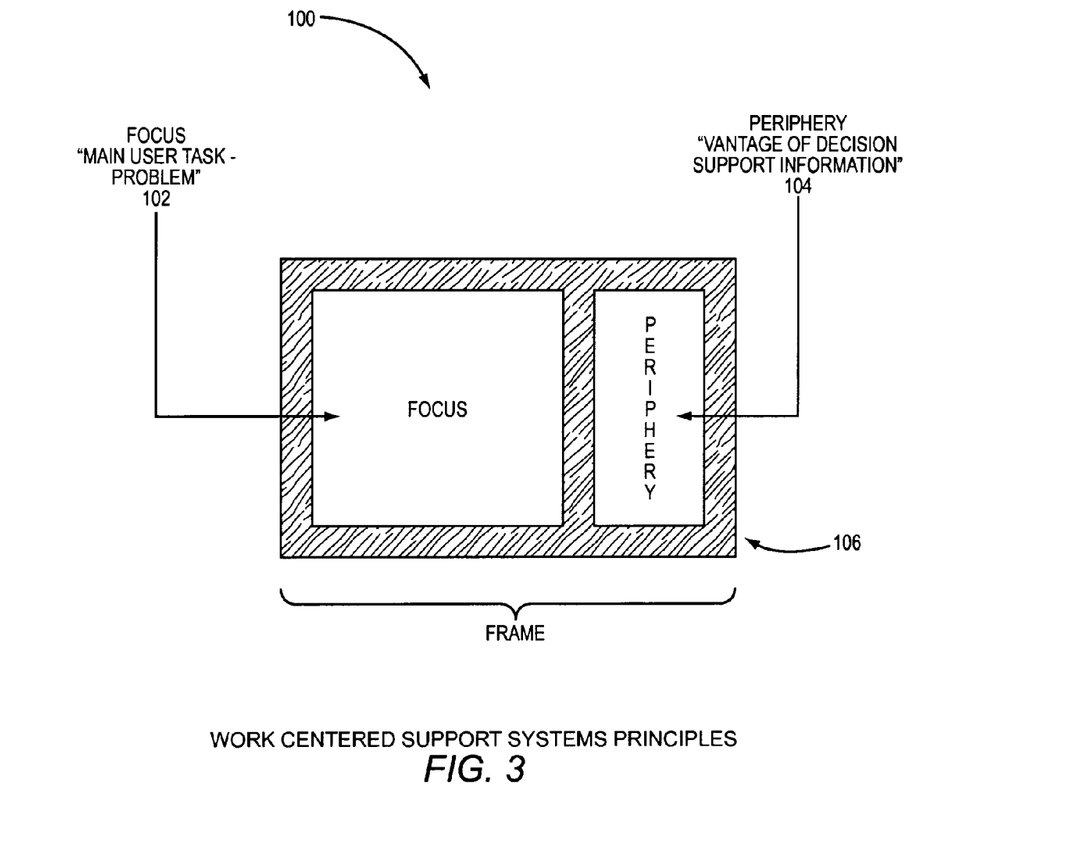
FIG. 3 illustrates a multi-region work centered displayable page.

FIG. 3 illustrates a work centered display screen of a type which can be presented on display 26a in accordance with the invention. The screen 100 includes a primary focus, centrally located, region 102 wherein the standard displays associated with the particular pre-existing software package, such as an enterprise resource management or planning package can be displayed a page at a time, perhaps using a Web Browser. The central region 102 provides the primary focus for the display.

Supplementing the primary focus 102 is a periphery 104 which is used to present a vantage of decision support information extracted by the WCSS software 32 in response to web page data received from the request software 30 (see FIG. 2). Finally, the screen 100 includes a lower, elongated control region 106 which can be used to present selected data in a common format from screen to screen such as date and time information, work flow identification information or the like all without limitation. The region 106 can also support a plurality of clickable buttons that the user U can use to manipulate the display 100.

Figure 4:
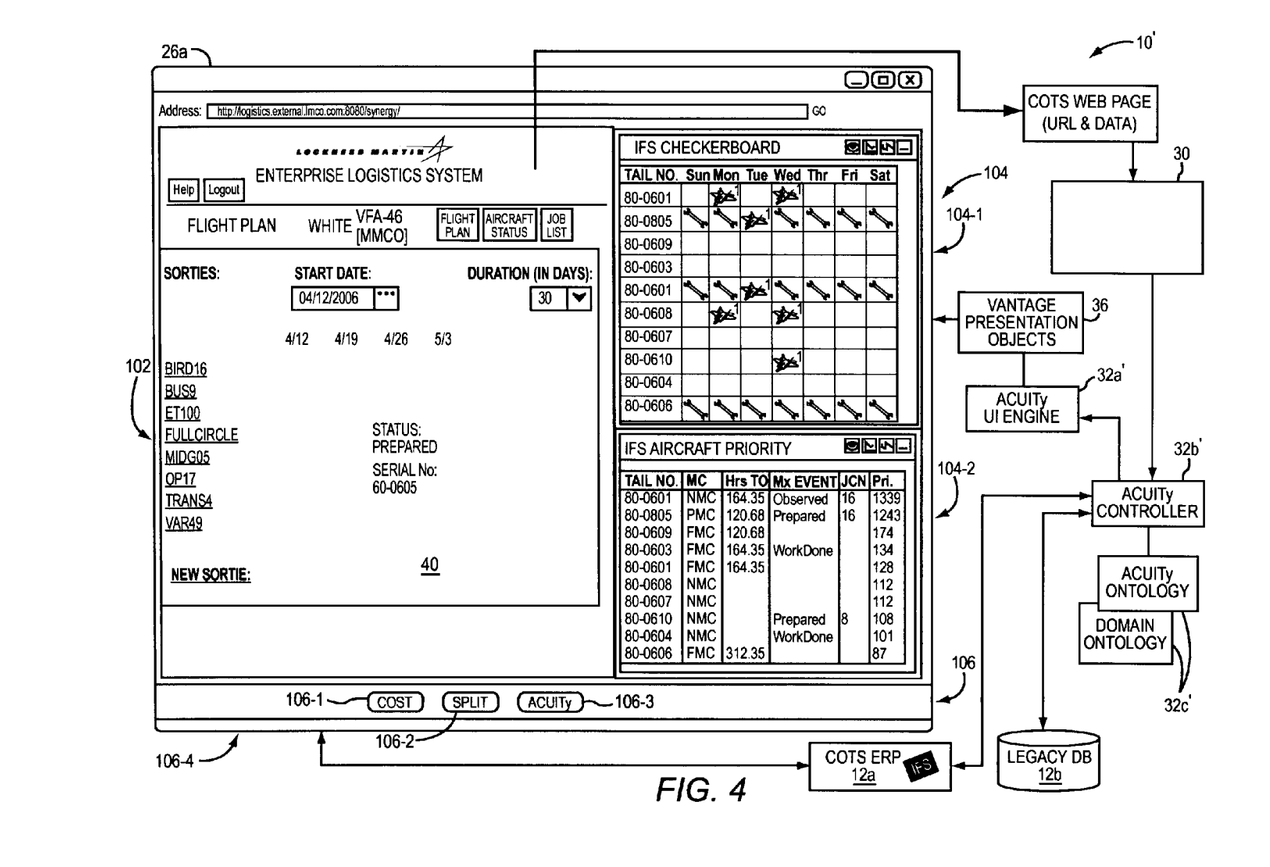
FIG. 4 is a block diagram of another system which embodies the invention.

FIG. 4 illustrates system 10 as implemented with a particular form of work centered support system, namely the ACUITy publicly available software noted above. In the system 10' of FIG. 4, supplemental vantage or decision support screens, region 104, have been integrated with a screen 40 displayed in focus region 102 a page which is used to plan sorties of various aircraft.

The supplemental decision support information including a scheduling checkerboard 104-1 and a prioritization agent 104-2 overlay the sortie planning web page which is in the focus region 104. Thus, when a user U accesses the flight plan/sortie planning page illustrated in the central region FIG. 4 from the enterprise resource planning software 12a, using the process described previously, the supplemental displays 104-1, 104-2 are automatically accessed and presented in the periphery 104.

As described previously, relative to FIG. 2, the request software 30 automatically obtains the URL and associated data for the web page being currently displayed in the focus region 102. That information is then passed on to the controller software 32b' which can in turn access one or more ontologies 32c' and/or legacy databases 12b which might have absolutely no connection whatsoever with the enterprise resource software 12a which is providing the page in the focus region 102. The interface engine 32a' can then process and present the presentation objects, such as the checkerboard 104-1 and agent list 104-2 automatically in the periphery region 104 to supplement the focus display 102.

Those of skill in the art will understand that the implementation illustrated in FIG. 4, using various modules from the ACUITy software work centered support system, is exemplary only. The use of other work centered support systems comes within the scope and spirit of the present invention all without limitation.

Figure 5:
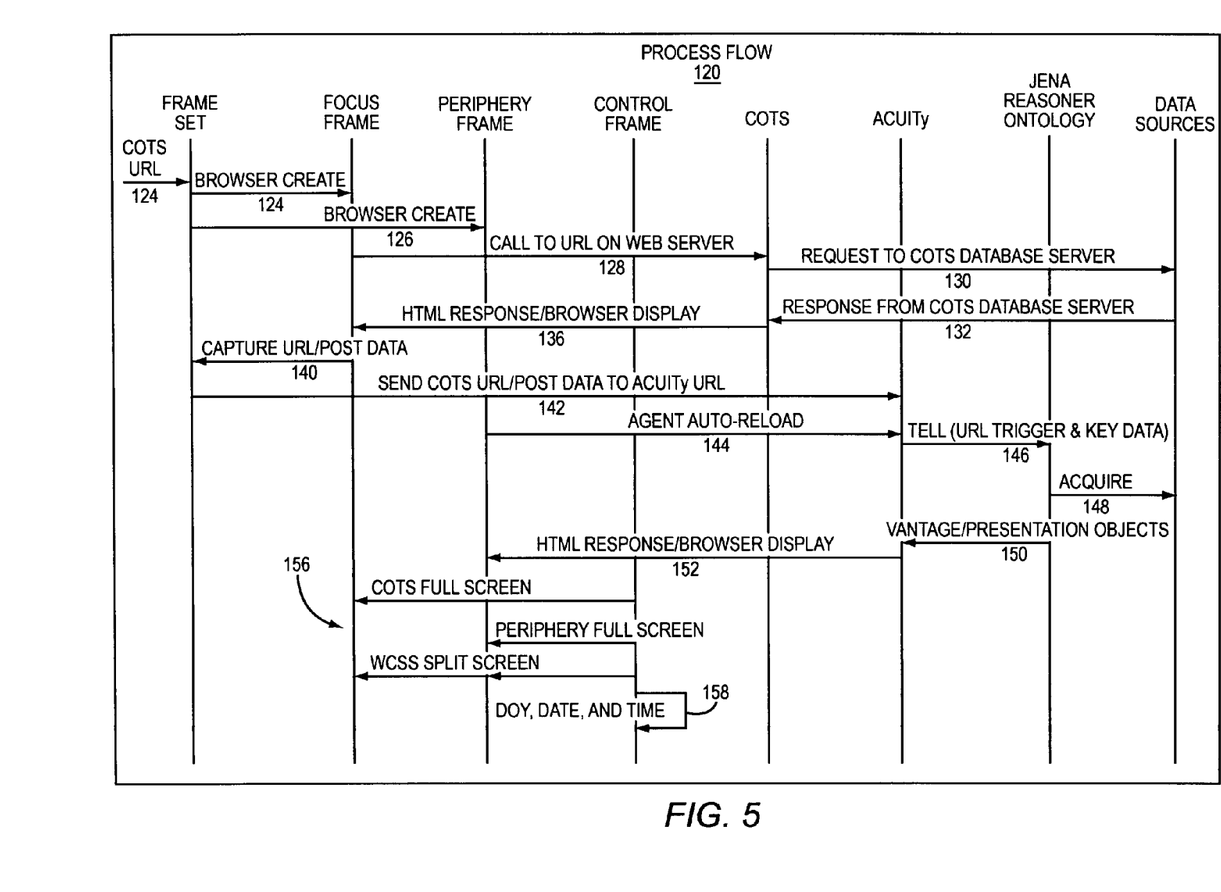
FIG. 5 illustrates a method that embodies the invention.

FIG. 5 illustrates a process 120 which can implement the displays in the regions 102, 104 and 106 (see FIG. 4). Initially a page is requested 124, by a user U from, for example web based application 12 or 12a. The user's browser then creates, 124, the focus frame (102 see FIG. 3). The browser then creates, 126, the periphery frame 104. The URL for the requested frame is then sent, 128, to the ISP server 14 and web based application 12, or 12'. The application 12, or 12' makes a request, 130, from its database server.

When the frame information is received, 132, by the application 12 or 12' it is forwarded via the Internet to the user's browser which presents, 136, the requested focus frame in the region 102 for viewing by the user U. The request software 30 can then capture the URL for the respective screen as well as any other available data, 140, and send, 142, that information to the controller 32b or 32b and at the same time a periphery frame reload request, 144, can be transmitted.

The controller 32b, 32b can then transmit, 146, the URL and relevant data to one or more ontologies 32c, 32c. The required data can be acquired, 148. The vantage and presentation objects can then be assembled via the interface 32a, 32a' and then forwarded, 152, for automatic presentation and display in the periphery region 104 adjacent to the focus region 102.

A screen format can be selected, 156, in response to activating one of the control elements 106-1, -2 or -3. Finally, in the control region 106-4, day and time information can be automatically presented on an ongoing basis, 158.

Figure 6:
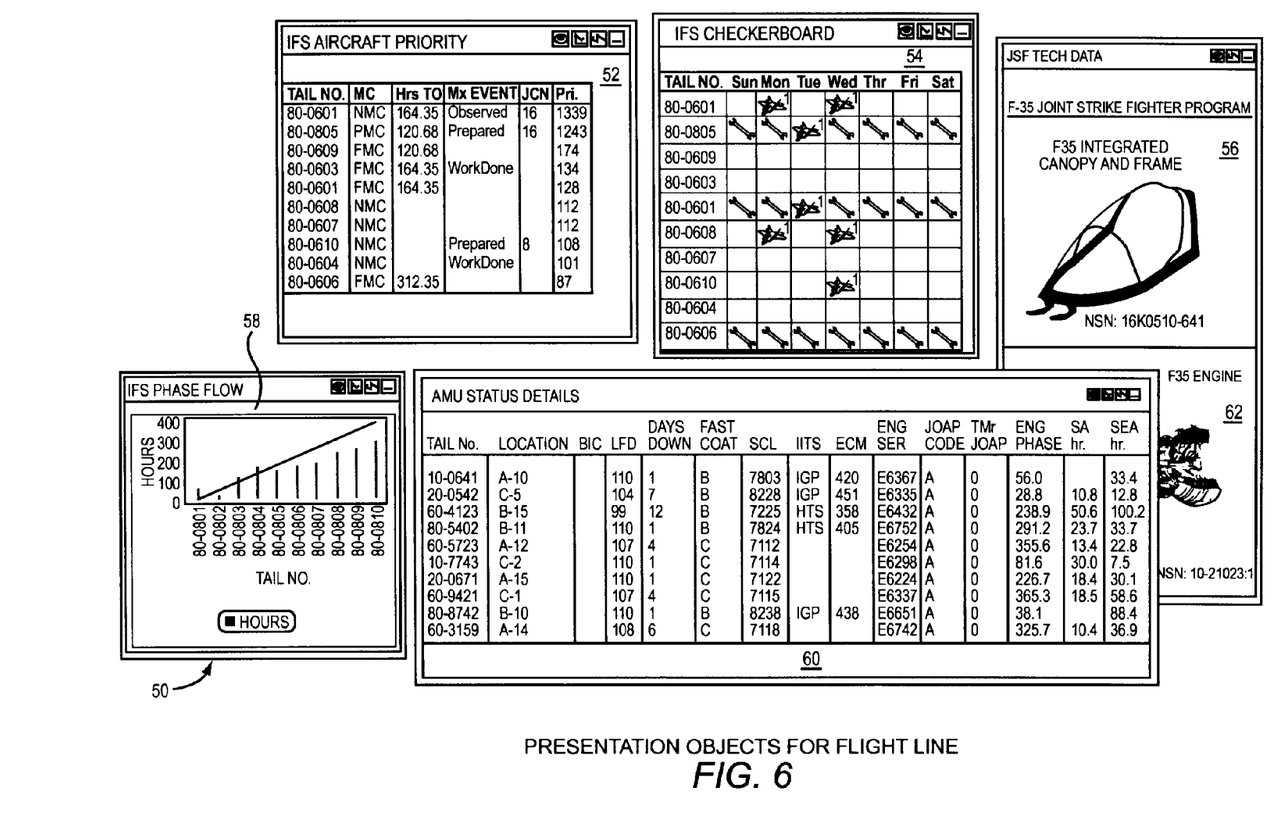
FIG. 6 illustrates exemplary presentation objects.

FIG. 6 illustrates several different presentation objects 50. These presentation objects implement an agent interface, traditional work artifacts, and legacy data visualizations. The above-described implementation could update the periphery 104 every few minutes such that all presentation objects which derive data from dynamic ERP or legacy data sources are updated in near-real-time. Exemplary characteristics of objects 50 are discussed below. The aircraft data shown herein is mockup data and does not represent any actual tactical or training information used in the U.S. Air Force or other armed services organization.

The "IFS Aircraft Priority" table 52 extracts data from an ERP database and processes this information through an agent which scores each tail number based upon its importance to aircraft generation. This table can show the mission capability in traditional green, yellow, red colors in addition to a top down order for the maintenance/operations prioritization score. An aircraft or asset at the top of the list (highest score) is most important to maintenance management for aircraft sortie generation. As sorties and maintenance states change, the prioritization agent re-scores the aircraft thereby aiding the maintenance manager.

The "IFS Checkerboard" 54 provides the weekly view from Sunday to Saturday based upon the selected date within the COTS application. This visualization shows a numeric tail number order for the aircraft relative to sorties, maintenance actions, and red-x aircraft. Red-X aircraft are scheduled to fly but are scheduled for a maintenance work order. This type of visualization provides a single glance view of operations and maintenance for the entire aircraft maintenance unit.

The "Tech Data" visualization 56 presents a web page of notional JSF-F35 parts and contains hyperlinks to the manufacturer's web page or joint tech data (JTD) document. The present implementation contextually links JTD to a work order by a maintenance procedure or job control number (JCN).

The "IFS Phase Flow" graph 58 is a traditional view of aircraft flight time remaining before a major inspection. The maintenance manager tries to maintain the linear phase line when assessing the planned (flying or maintenance) use for the aircraft. This process insures that only one aircraft will be in a phase inspection state at any giving time. Aircraft with phase hours below the line can be used in maintenance events such as training, where the aircraft remains fully mission capable but accounts for no flying hours.

The "AMU Status Details" table 60 presents data in a form which is typically found in a F16 ProSuper's notebook. This data originates from a legacy SQL database and is accessed and presented using the controller 32b, 32b'. This presentation includes data not present in the COTS ERP system and provides domain specific tailoring beyond the design of the COTS application. This type of legacy visualization could provide data in alternative formats or transformations for unit of measure or domain terminology.

Figure 7:
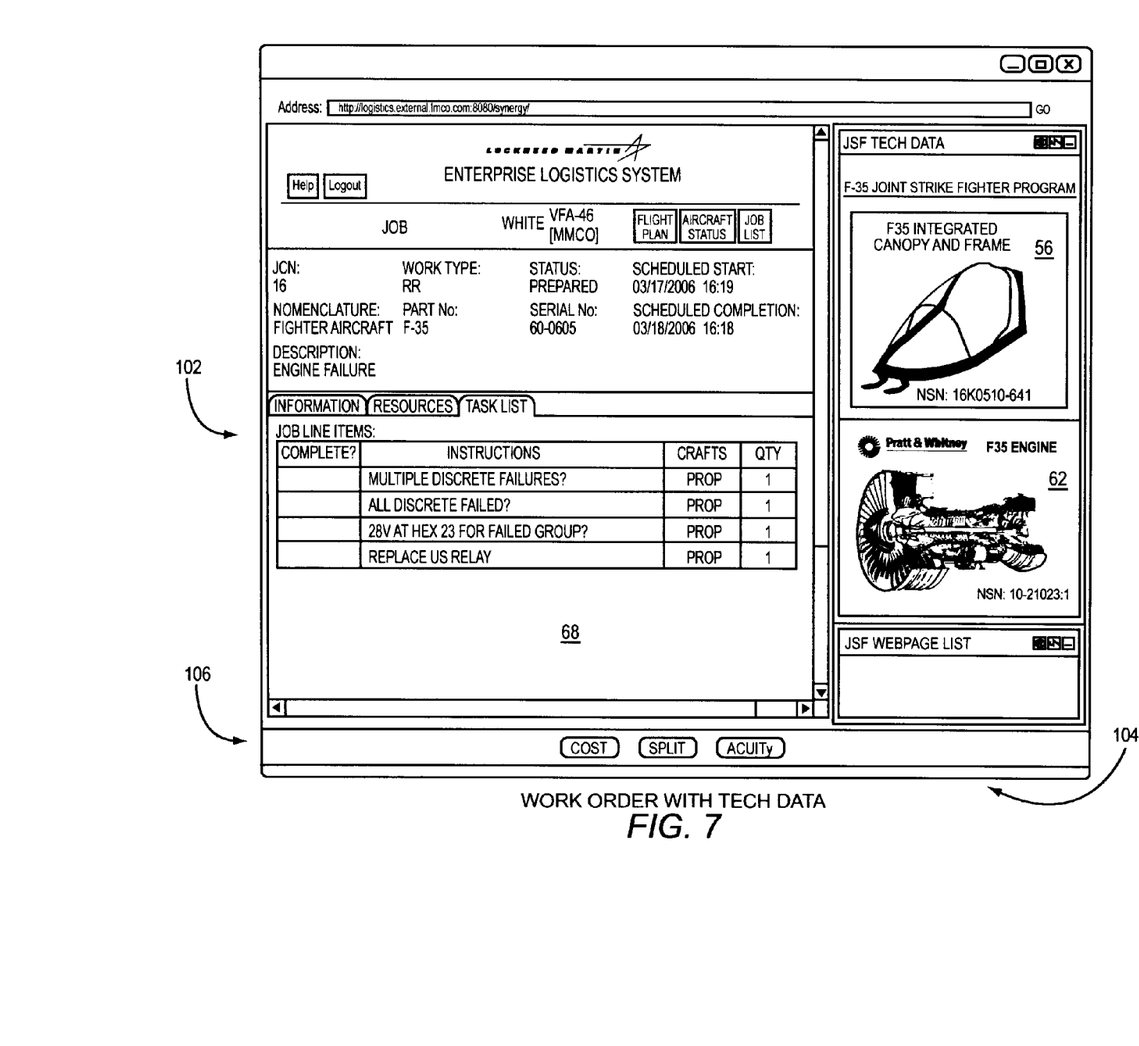
FIG. 7 illustrates another multi-sectional display in accordance with the invention.

FIG. 7 illustrates another example of a composite screen presentable by a system such as the system 10' in accordance with the present invention. A maintenance screen 68 from a web enabled logistic package has been presented in the focus 102. System 10, 10' has automatically retrieved, and displayed in periphery 104, presentation objects 56 and 62 which provide specific parts related information not available on screen 68.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A process comprising:
receiving, by a processor, a resource identifier that identifies a primary application hosted by a Web server remotely located from a computer containing said processor;
responsive to a browser request, obtaining at the computer from the primary application of the Web server, a user-interactive Web page generated by the primary application;
conveying from the computer a supplemental request to a network server remotely located from the computer, wherein the supplemental request comprises the resource identifier that identifies the primary application, wherein the network server accesses an ontology based on the resource identifier to select a particular supplemental application that is unknown to the primary application, from a plurality of supplemental applications unknown to the primary application, and to select a second supplemental application that is unknown to the primary application from the plurality of supplemental applications;
obtaining at the computer from the particular supplemental application of the network server a response to the supplemental request that includes a supplemental image; obtaining at the computer from the second supplemental application a second supplemental image; and
presenting on a display a user interface window that includes a first frame that depicts the user-interactive Web page, and a second frame that depicts the supplemental image, and a third frame that depicts the second supplemental image.

2. The process as in claim 1, wherein the user interface window is a user interface window of a browser executing on the computer, the first frame, the second frame, and the third frame being non-overlapping and being within the user interface window.

3. The process of claim 1, wherein the user-interactive Web page is displayed in a focus region of the user interface window and the supplemental image is placed in a periphery region of the user interface window immediately adjacent to the focus region.

4. The process of claim 1, wherein the resource identifier comprises a Uniform Resource Locator (URL) identifying the primary application.

5. The process of claim 4, wherein the URL is received from the primary application and further comprises post data generated by the primary application in response to a request by a user, and wherein the supplemental request comprises the post data.

6. The process of claim 1, wherein the user interface window is a user interface window of a browser, said process further comprising:
receiving via a navigation field of the user interface window of the browser running on the computer, user input for a Uniform Resource Locator (URL);
conveying a Hypertext Transfer Protocol (HTTP) request from the computer over a network to the Web server assigned to the URL, wherein the URL is the resource identifier, and wherein the HTTP request is the browser request;
receiving at the computer a response satisfying the HTTP request from the Web server, wherein the user-interactive Web page is included in the response; and
conveying a second HTTP request from the computer over the network to the network server, wherein the second HTTP request is the supplemental request, wherein said presenting comprises:
rendering content of the response within the first frame of the user interface window of the browser; and
rendering content of the second response within the second frame of the user interface window of the browser.

7. The process of claim 1, further comprising:
determining a role of a user of the primary application; and wherein:
conveying from the computer the supplemental request to the network server remotely located from the computer, wherein the supplemental request comprises the resource identifier, wherein the network server accesses an ontology based on the resource identifier to determine the particular supplemental application that is independent of the primary application, wherein the ontology comprises data that associates the particular supplemental application with the primary application based on the resource identifier, further comprises:
conveying from the computer the supplemental request to the network server remotely located from the computer, wherein the supplemental request comprises the resource identifier and the role of the user, wherein the network server accesses the ontology based on the resource identifier and the role of the user to determine the particular supplemental application that is independent of the primary application, wherein the ontology comprises data that associates the particular supplemental application with the primary application based on the resource identifier and the role of the user.

8. A method for interacting with the Web from a browser comprising:
receiving, by a computer, a Uniform Resource Locator (URL) that identifies a Web Server;
conveying a Hypertext Transfer Protocol (HTTP) request from the computer over a network to the Web server;
receiving at the computer a response satisfying the HTTP request from the Web server;
rendering content of the response within a first frame of a user interface window of the browser, the content comprising a user-interactive Web page;
conveying a second HTTP request from the computer over the network to a network server that is unknown to the Web server and not identified within the response, wherein the second HTTP request includes the URL, the network server comprising an ontology identifying an association between the URL and a particular supplemental application of a plurality of supplemental applications, and identifying an association between the URL and a second supplemental application of the plurality of supplemental applications;
receiving a second response from the particular supplemental application that results from the second HTTP request;
receiving a third response from the second supplemental application that results from the second HTTP request; and
rendering content of the second response within a second frame of the user interface window of the browser and content of the third response within a third frame of the user interface window.

9. The method of claim 8, wherein said content of the second response rendered within the second frame is contextually related to the content of the response rendered within the first frame and expands upon the content of the response rendered within the first frame.

10. The method of claim 9, wherein the second HTTP request comprises at least a portion of the content of the response, which the network server utilizes in determining the content of the second response.

11. The method of claim 9, wherein the first frame and the second frame are interface sections of a Web application, wherein the URL specifically requests the Web application be instantiated within the browser, wherein the second HTTP request is for supplemental information that extends the functionality of the Web application beyond functionality provided by the Web server.

12. The method of claim 9, wherein the network server is not referenced in the response satisfying the HTTP request from the Web server.

13. The method of claim 9, wherein the content of the second response rendered within the second frame does not include advertising.

14. The method of claim 9, further comprising:
code of the browser automatically expanding a presentation region of the user interface window beyond a default presentation size for presenting the response satisfying the HTTP request provided by the Web server, so that the expanded presentation region of the user interface window is sufficient for concurrently presenting the content of the response rendered within the first frame and the content of the second response rendered within the second frame.

15. The method of claim 9, further comprising:
receiving user input from the user interface window that causes a third HTTP request to be conveyed from the computer over the network to the Web server;
receiving at the computer a fourth response satisfying the third HTTP request from the Web server;
changing information presented in the first frame in accordance with the fourth response;
conveying a fourth HTTP request from the computer over the network to the network server;
receiving a fifth response from the network server that results from the fourth HTTP request; and
rendering content of the fifth response within the second frame of the user interface window of the browser.

16. The method of claim 9, wherein instantiation of the second frame of the user interface window of the browser was never explicitly requested by user input and was never explicitly requested by the Web server.

17. The method of claim 9, further comprising:
automatically expanding a presentation region of the user interface window beyond a default presentation size for presenting the response satisfying the HTTP request provided by the Web server, so that the expanded presentation region of the user interface window is sufficient for concurrently presenting the content of the response rendered within the first frame and the content of the second response rendered within the second frame.

18. A method for interacting with the Web from a browser comprising:
conveying a Web application request from a computer over a network to a Web server assigned to a Uniform Resource Locator (URL);
receiving at the computer a response satisfying the Web application request from the Web server;
rendering content of the response within a first frame of a user interface window of the browser, the content of the response comprising a user-interactive Web page;
conveying a supplemental request from the computer over the network to a network server that is unknown to the Web server, wherein the supplemental request includes the URL and includes the content of the response, the network server comprising an ontology identifying an association between the URL and a particular supplemental application of a plurality of supplemental applications, and identifying an association between the URL and a second supplemental application of the plurality of supplemental applications;
receiving a supplemental response from the particular supplemental application that results from the supplemental request;
receiving a second supplemental response from the second supplemental application; and
rendering content of the supplemental response within a second frame of the user interface window of the browser, and content of the second supplemental response within a third frame of the user interface window.

19. The method of claim 18, wherein the content of the supplemental response rendered within the second frame is contextually related to the content of the response rendered within the first frame and expands upon the content of the response rendered within the first frame.

20. The method of claim 18, wherein the Web server and the network server are independent servers operated by different entities, wherein the network server provides content that expands functionality of a Web application.

21. A computer system for interacting with the Web from a browser, the computer system comprising:
one or more processors, one or more computer-readable memories and one or more computer-readable, tangible storage devices;
program instructions, stored on at least one of the one or more computer-readable, tangible storage devices for execution by at least one of the one or more processors via at least one of the one or more computer-readable memories, to convey a Web application request from a computer over a network to a Web server assigned to a Uniform Resource Locator (URL);
program instructions, stored on the at least one of the one or more computer-readable, tangible storage devices for execution by the at least one of the one or more processors via the at least one of the one or more computer-readable memories, to receive at the computer a response satisfying the Web application request from the Web server;
program instructions, stored on the at least one of the one or more computer-readable, tangible storage devices for execution by the at least one of the one or more processors via the at least one of the one or more computer-readable memories, to render content of the response within a first frame of a user interface of the browser, the content of the response comprising a user-interactive Web page;
program instructions, stored on the at least one of the one or more computer-readable, tangible storage devices for execution by the at least one of the one or more processors via the at least one of the one or more computer-readable memories, to convey a supplemental request from the computer over the network to a network server that is unknown to the Web server, wherein the supplemental request includes the URL and includes content extracted from the response, the network server comprising an ontology identifying an association between the URL and a particular supplemental application of a plurality of supplemental applications, and identifying an association between the URL and a second supplemental application;

program instructions, stored on the at least one of the one or more computer-readable, tangible storage devices for execution by the at least one of the one or more processors via the at least one of the one or more computer-readable memories, to receive a supplemental response from the particular supplemental application that results from the supplemental request;

program instructions, stored on the at least one of the one or more computer-readable, tangible storage devices for execution by the at least one of the one or more processors via the at least one of the one or more computer-readable memories, to receive a second supplemental response from the second supplemental application; and program instructions, stored on the at least one of the one or more computer-readable, tangible storage devices for execution by the at least one of the one or more processors via the at least one of the one or more computer-readable memories, to render content of the supplemental response within a second frame of the user interface of the browser, and to render content of the second supplemental response within a third frame of the user interface.

* * * * *